United States Patent
Pan

(12) United States Patent (10) Patent No.: US 8,020,824 B2
Pan (45) Date of Patent: Sep. 20, 2011

(54) ADJUSTMENT ASSEMBLY FOR A SATELLITE ANTENNA

(75) Inventor: Tien-Chih Pan, Nantou (TW)

(73) Assignee: Jonsa Technologies Co., Ltd., Nantou (TW)

( * ) Notice: Subject to any disclaimer, the term of this patent is extended or adjusted under 35 U.S.C. 154(b) by 260 days.

(21) Appl. No.: 12/534,942

(22) Filed: Aug. 4, 2009

(65) Prior Publication Data

US 2011/0031360 A1 Feb. 10, 2011

(51) Int. Cl.
*E04G 3/00* (2006.01)

(52) U.S. Cl. .............. 248/299.1; 248/222.51; 248/276.1

(58) Field of Classification Search .............. 248/299.1, 248/274.1, 276.1, 278.1, 279.1, 284.1, 222.51
See application file for complete search history.

(56) References Cited

U.S. PATENT DOCUMENTS

| | | | | |
|---|---|---|---|---|
| 2,667,317 A * | 1/1954 | Trebules | ...................... | 248/514 |
| 2,734,708 A * | 2/1956 | Cohn | ........................... | 248/517 |
| 4,560,129 A * | 12/1985 | Clayton | ..................... | 248/278.1 |
| 5,941,497 A * | 8/1999 | Inoue et al. | ................... | 248/514 |
| 6,098,562 A * | 8/2000 | Forthmann | ................ | 114/144 R |
| 6,264,152 B1 * | 7/2001 | Bloch et al. | ................ | 248/274.1 |
| 6,484,987 B2 * | 11/2002 | Weaver | ...................... | 248/278.1 |
| 6,864,855 B1 * | 3/2005 | Fujita | ............................ | 343/882 |
| 7,753,332 B2 * | 7/2010 | O'Keene | .................. | 248/292.14 |

* cited by examiner

*Primary Examiner* — Terrell McKinnon
*Assistant Examiner* — Steven Marsh
(74) *Attorney, Agent, or Firm* — Alan Kamrath; Kamrath & Associates PA

(57) ABSTRACT

An adjustment assembly for a satellite antenna has a first bracket, a second bracket, a pivotal bolt and an adjustment device. The second bracket is mounted pivotally on the first bracket. The pivotal bolt is mounted through the first bracket and the second bracket and serves as a fulcrum when the brackets pivot relatively. The adjustment device is mounted between the first bracket and the second bracket and has a positioning fastener, a driving fastener and an adjustment shaft. The positioning fastener is mounted on the first bracket. The driving fastener is mounted on the second bracket. The adjustment shaft is mounted rotatably through the driving fastener and into positioning fastener and has a threaded section and a positioning section. The threaded section allows the driving fastener to move along the adjustment shaft when the adjustment shaft is rotated.

20 Claims, 9 Drawing Sheets

ADJUSTMENT ASSEMBLY FOR A SATELLITE ANTENNA

BACKGROUND OF THE INVENTION

1. Field of the Invention

The present invention relates to a part of an adjustment assembly, and more particularly to an adjustment assembly for a satellite antenna.

2. Description of Related Art

Conventional adjustment assemblies for a satellite antenna are available in various forms. The conventional adjustment assemblies are used to adjust a latitudinal or longitudinal angle for a satellite antenna to receive signals transmitted from a satellite. The inventor has been devoted to provide a new and different type of an adjustment assembly for a satellite antenna for improved more choice, and address user requirements.

SUMMARY OF THE INVENTION

The main objective of the invention is to provide a new and different adjustment assembly for a satellite antenna for improved more choice.

An adjustment assembly for a satellite antenna has a first bracket, a second bracket, a pivotal bolt and an adjustment device. The second bracket is mounted pivotally on the first bracket. The pivotal bolt is mounted through the first bracket and the second bracket and serves as a fulcrum when the brackets pivot. The adjustment device is mounted between the first bracket and the second bracket and has a positioning fastener, a driving fastener and an adjustment shaft. The positioning fastener is mounted on the first bracket. The driving fastener is mounted on the second bracket. The adjustment shaft is mounted rotatably through the driving fastener and into the positioning fastener and has a threaded section and a positioning section. The threaded section allows the driving fastener to move along the adjustment shaft when the adjustment shaft is rotated.

Other objects, advantages and novel features of the invention will become more apparent from the following detailed description when taken in conjunction with the accompanying drawings.

DETAILED DESCRIPTION OF PREFERRED EMBODIMENT

An adjustment assembly for a satellite antenna in accordance with the present invention may have an adjustment device mounted between a first bracket and a second bracket to make the brackets pivot relative to each other. The preferred embodiment as follows comprises two adjustment devices and three brackets.

Figure 1:
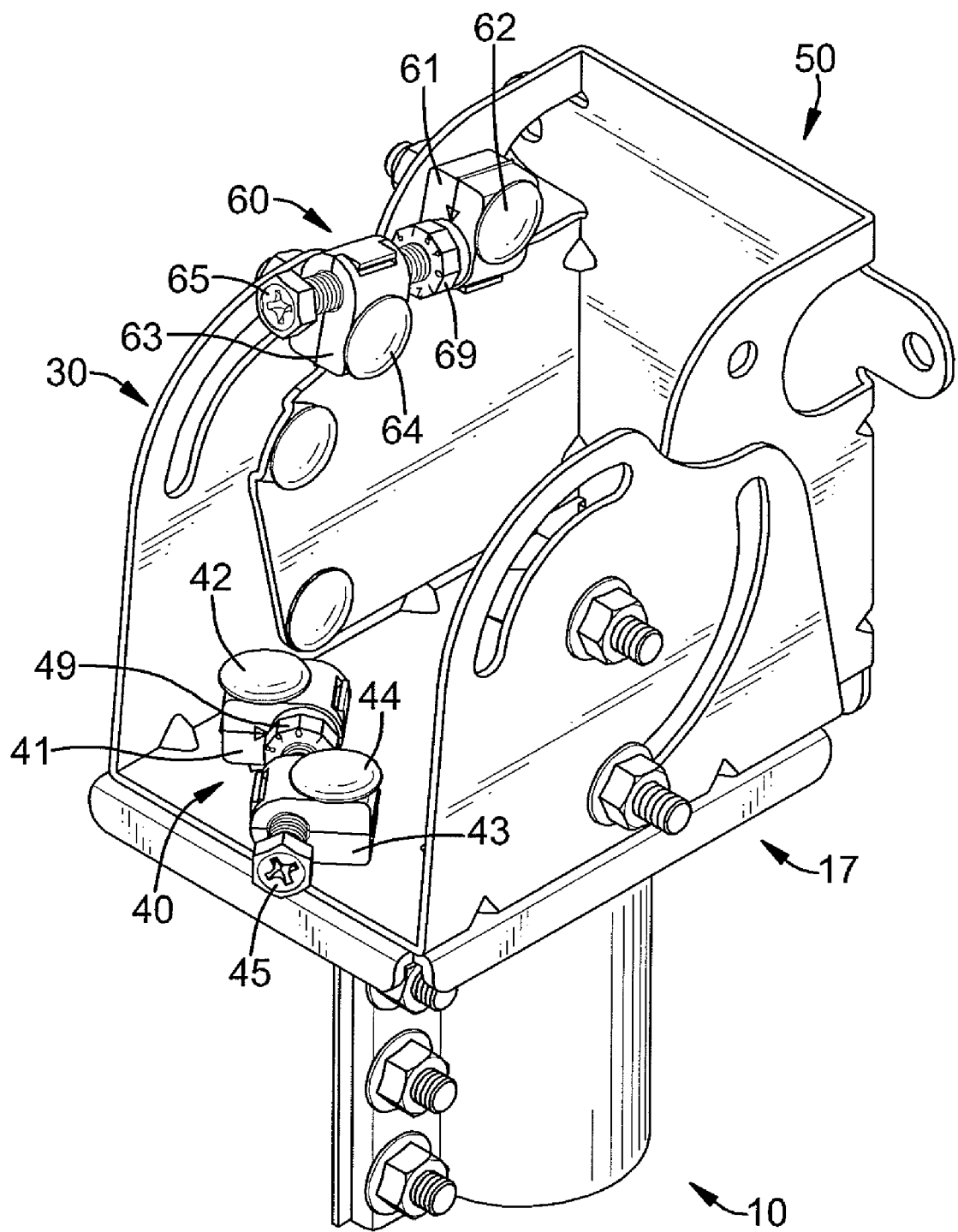
FIG. 1 is a right perspective view of an adjustment assembly for a satellite antenna in accordance with the present invention.
Figure 2:
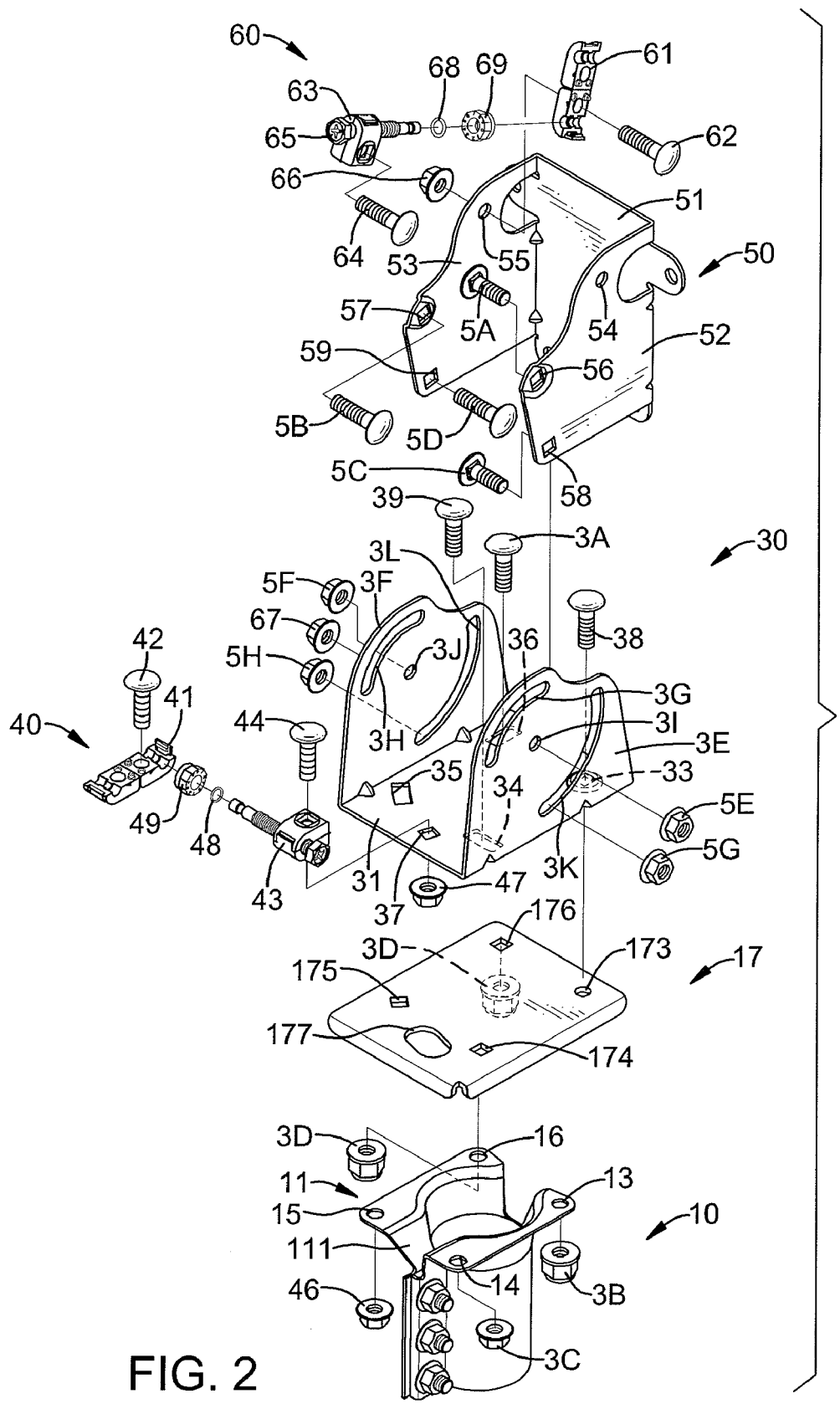
FIG. 2 is an exploded perspective view of the adjustment assembly for a satellite antenna in FIG. 1.
Figure 3:
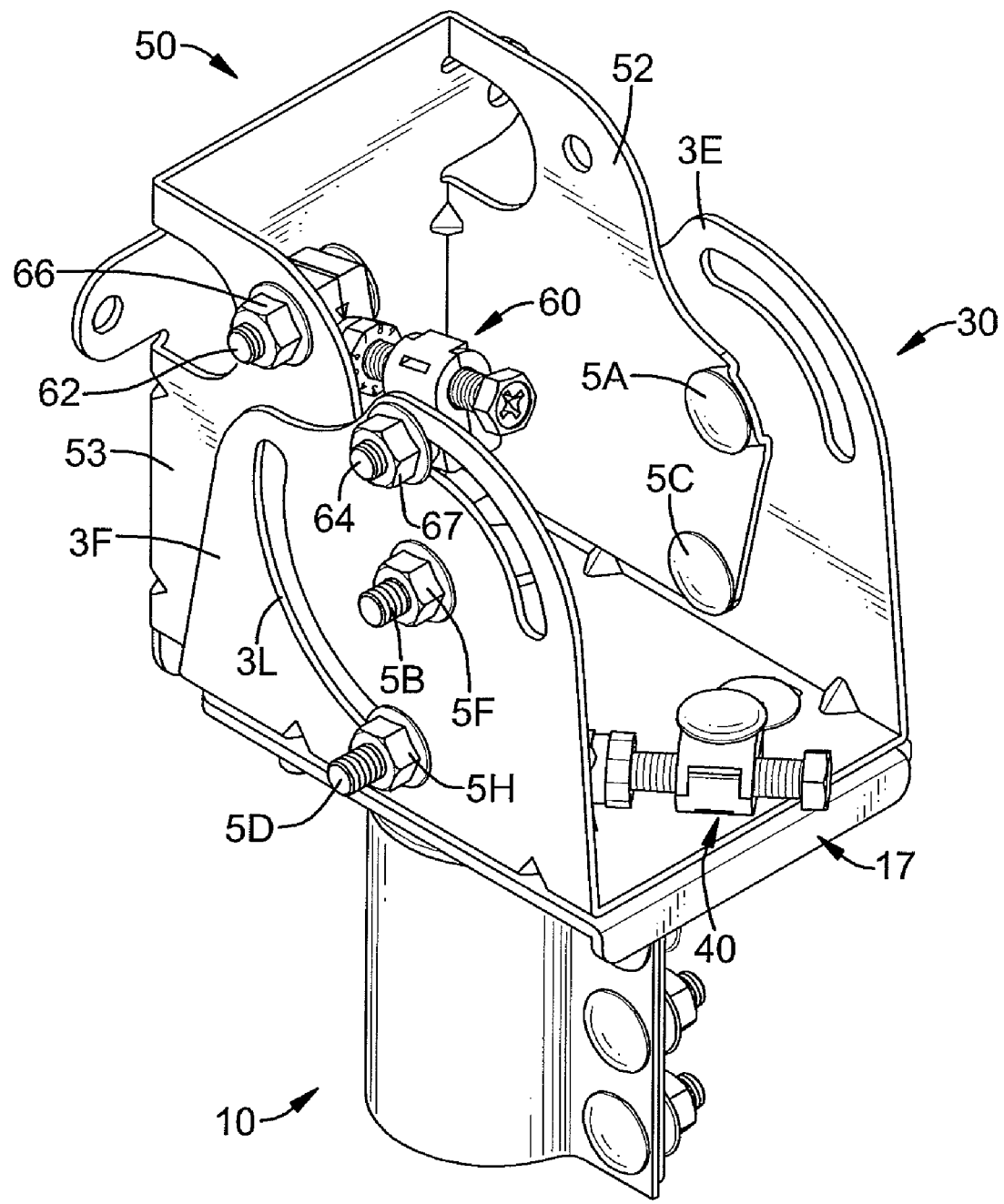
FIG. 3 is a left perspective view of the adjustment assembly for a satellite antenna in FIG. 1.
Figure 4:
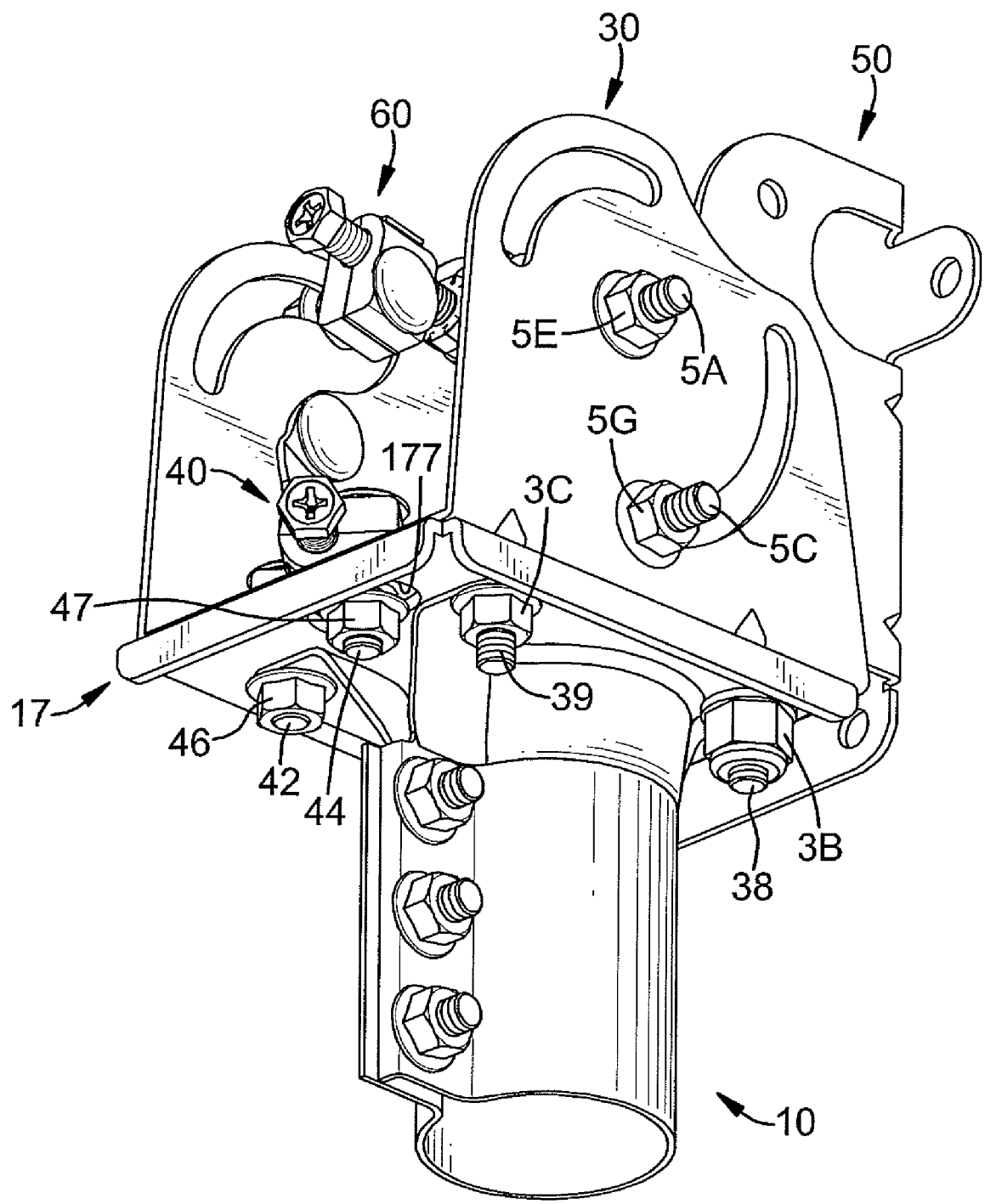
FIG. 4 is a bottom perspective view of the adjustment assembly for a satellite antenna in FIG. 1.

With reference to FIGS. 1 to 2, an adjustment assembly for a satellite antenna in accordance with the present invention comprises a stationary bracket (10), a rotation bracket (30), a first adjustment device (40), an inclination bracket (50) and a second adjustment device (60) which has a structure the same as that of the first adjustment device (40).

The first adjustment device (40) is mounted between the stationary bracket (10) and the rotation bracket (30). The stationary bracket (10) is the first bracket and the rotation bracket (30) is the second bracket. Similarly, the second adjustment device (60) is mounted between the inclination bracket (50) and the rotation bracket (30). The inclination bracket (50) is the first bracket and the rotation bracket (30) is the second bracket.

The stationary bracket (10) has a top surface (11), a pivotal hole (13), two stationary holes (14,16), a positioning hole (15) and a board (17). The top surface (11) has a cavity (111) and two sections. The cavity (111) has two sides and is formed in the top surface (11) of the stationary bracket (10) to divide the top surface (11) into the two sections respectively at the two sides of the cavity (111). The pivotal hole (13), the stationary holes (14,16) and the positioning hole (15) are formed through the sections of the top surface (11) of the stationary bracket (10) and are arranged clockwise. The pivotal hole (13) and the stationary hole (14) are defined in the same section of the top surface (11) of the stationary bracket (10), and the positioning hole (15) and the stationary hole (16) are defined in the other section of the top surface (11) of the stationary bracket (10).

The board (17) is mounted securely on the top surface (11) of the stationary bracket (10) and has a board pivotal hole (173), two board holes (174,176), a board positioning hole (175) and a board opening (177). The board pivotal hole (173) is defined through the board (17) and aligns with the pivotal hole (13) of the stationary bracket (10). The board holes (174,176) are defined through the board (17) and align respectively with the stationary holes (14,16). The board positioning hole (175) is defined through the board (17) and aligns with the positioning hole (15) of the stationary bracket (10). The board opening (177) is defined through the board (17) at a location between one of the board holes (174) and the board positioning hole (175), corresponds to and aligns with the cavity (111), is arced and has a length and an arc fulcrum at the board pivotal hole (173).

The rotation bracket (30) is pivotally mounted on the stationary bracket (10) and has a base (31), a pivotal hole (33), two bracket openings (34,36), a positioning opening (35), a driving hole (37), a pivotal bolt (38), multiple bolts (39,3A), multiple nuts (3B,3C,3D), a pair of wings (3E,3F), a pair of stabilizing grooves (3G,3H), a pair of wing pivotal holes (3I,3J) and a pair of guiding grooves (3K,3L). The base (31) is pivotally mounted on the board (17) and has a pair of opposite edges. The pivotal hole (33) of the rotation bracket (30) is defined through the base (31) and aligns with the board pivotal hole (173). The bracket openings (34,36) are respectively defined through the base (31) and align respectively with the board holes (174,176). The bracket openings (34,36) are arced and respectively have an arc fulcrum at the pivotal hole (33) of the rotation bracket (30). The positioning opening (35) is defined through the base (31), aligns with the board positioning hole (175), is arced and has an arc fulcrum at the pivotal hole (33) of the rotation bracket (30). The driving hole (37) is defined through the base (31), aligns with the board opening (177), and has a length. The length of the driving hole (37) is smaller than that of the board opening (177). The pivotal bolt (38) is mounted in sequence through the pivotal hole (33) of the rotation bracket (30), the board pivotal hole (173) and the pivotal hole (13) of the stationary bracket (10). The bolt (39) is mounted in sequence through the bracket opening (34), the board hole (174) and the stationary hole (14). The bolt (3A) is mounted in sequence through the bracket opening (36), the board hole (176) and the stationary hole (16). The nut (3B) is screwed with the pivotal bolt (38) of the rotation bracket (30). The nuts (3C,3D) are respectively screwed with the bolts (39,3A) to secure the rotation bracket (30) at a specific angle relative to the stationary bracket (10). The wings (3E,3F) are respectively formed on and protrude upward from the opposite edges of the base (31). The stabilizing grooves (3G,3H) are respectively defined through the wings (3E,3F). The wing pivotal holes (3I,3J) are respectively defined through the wings (3E,3F). The guiding grooves (3K, 3L) are respectively defined through the wings (3E,3F). The wing pivotal holes (3I,3J) are respectively between the stabilizing grooves (3G,3H) and the guiding grooves (3K,3L). The stabilizing grooves (3G,3H) and the guiding grooves (3K,3L) are arced and have a same arc fulcrum at the wing pivotal holes (3I,3J).

Figure 5:
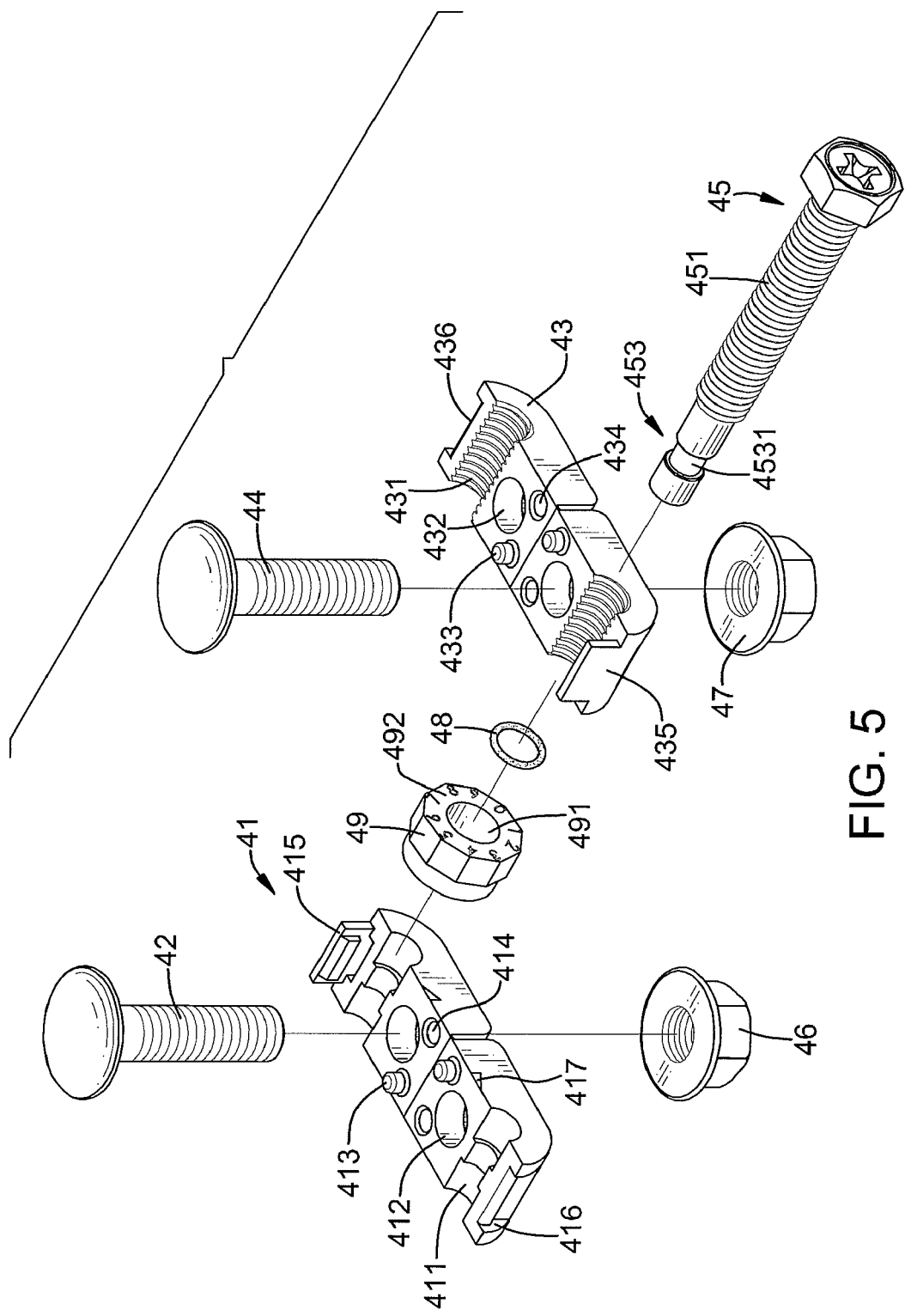
FIG. 5 is an exploded perspective view of a first adjustment device in the adjustment assembly for a satellite antenna in FIG. 1.
Figure 6:
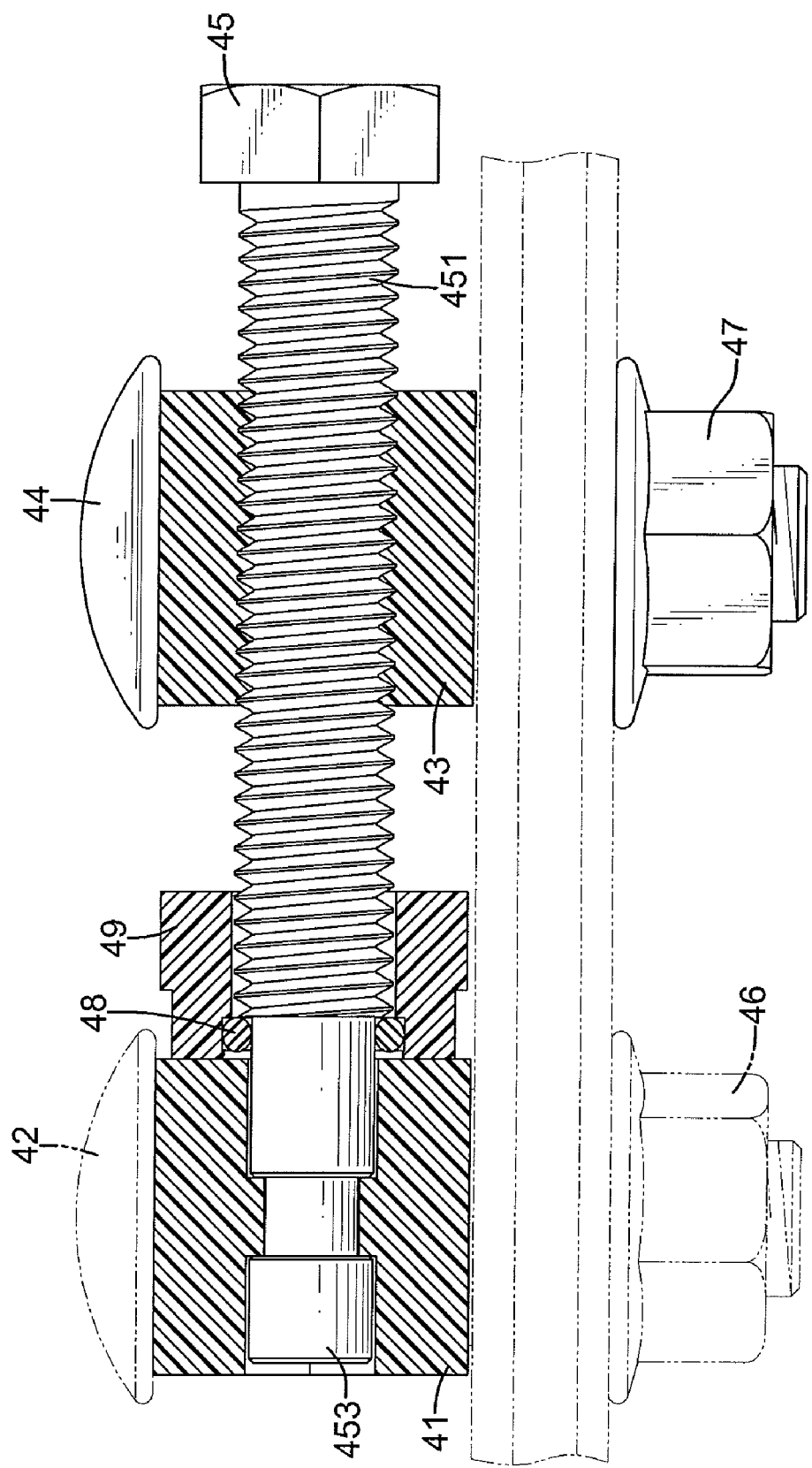
FIG. 6 is an enlarged side view in partial section of the first adjustment device in FIG. 5.

With further reference to FIGS. 5 and 6, the first adjustment device (40) is mounted between the stationary bracket (10) and the rotation bracket (30) and has a positioning fastener (41), a positioning bolt (42), a driving fastener (43), a driving bolt (44), an adjustment shaft (45), a positioning nut (46), a driving nut (47), an O-ring (48) and a measure wheel (49). Preferably, the positioning fastener (41) and the driving fastener (43) are plastic. The positioning fastener (41) is mounted on the base (31) and has a first chunk, a second chunk, a pair of opposite sides, a hollow (411), a through hole (412), a pair of bosses (413), a pair of recesses (414), a clamping protrusion (415), a clamping recess (416) and an indicator (417). The first chunk and the second chunk are pivotally connected to and clamp each other at a pivotal axis and each chunk has a clamping face abutting the other clamping face. The hollow (411) of the positioning fastener (41) is defined through the positioning fastener (41), is composed of two cavities defined respectively in the clamping faces of the chunks and has an inner surface and an inner protrusion. The inner protrusion is annular and protrudes from the inner surface of the hollow (411) of the positioning fastener (41). The through hole (412) of the positioning fastener (41) is defined through the first chunk and the second chunk along a direction perpendicular to the clamping face and aligns with the positioning opening (35). The bosses (413) are formed respectively on the clamping faces of the chunks. The recesses (414) are formed respectively in the clamping faces of the chunks. The recesses (414) of the chunks combine with corresponding bosses (413) on the other chunk when the chunks are combined together. The clamping protrusion (415) protrudes from one end of the first chunk opposite to the pivotal axis. The clamping recess (416) is recessed in the second chunk and detachably engages the clamping protrusion (415). With the combination of the bosses (413) and corresponding recesses (414) and the engagement of the clamping protrusion (415) and a corresponding clamping recess (416), the chunks of the positioning fastener (41) can be securely combined together.

The positioning bolt (42) is mounted in sequence through the through hole (412) of the positioning fastener (41), the positioning opening (35), the board positioning hole (175) and the positioning hole (15). The positioning bolt (42) is screwed with the positioning nut (46).

The driving fastener (43) is mounted on the base (31), is composed of a pair of chunks which are similar to the first chunk and the second chunk of the positioning fastener (41) and has a threaded hollow (431), a through hole (432), a pair of bosses (433), a pair of recesses (434), a clamping protrusion (435) and a clamping recess (436). The structure of the driving fastener (43) is substantially the same as that of the positioning fastener (41) except for the hollow (411) and the indicator (417). The threaded hollow (431) aligns with the hollow (411) of the positioning fastener (41) and has a length. The through hole (432) of the driving fastener (43) aligns with the driving hole (37). The driving bolt (44) is mounted in sequence through the through hole (432) of the driving fastener (43), the driving hole (37) and the board opening (177). The driving bolt (44) is screwed with the driving nut (47). The adjustment shaft (45) is mounted through the driving fastener (43) and into the positioning fastener (41) and has an outer surface, a threaded section (451) and a positioning section (453). The threaded section (451) is defined around the outer surface of the adjustment shaft (45), engages the threaded hollow (431) and has a length. Engagement of the threaded hollow (431) and the threaded section (451) will allow the driving fastener (43) to move along the threaded section (451). Preferably, the length of the threaded section (451) is longer than that of the threaded hollow (431). The positioning section (453) is defined around the outer surface of the adjustment shaft (45) beside the threaded section (451), is mounted rotatably in the hollow (411) of the positioning fastener (41) and has a groove (4531). The groove (4531) is annular, is defined around the positioning section (453) and combines with the inner protrusion of the positioning fastener (41). The combination of the groove (4531) and the inner protrusion of the positioning fastener (41) makes the positioning section (453) rotatably combine with the positioning fastener (41), but prevents lateral movement of the positioning section (453) relative to the hollow (411) of the positioning fastener (41).

The O-ring (48) is mounted securely around the positioning section (453) and is adjacent to the threaded section (451). The measure wheel (49) is mounted securely around the O-ring (48), is adjacent to the indicator (417) and has one side, a wheel hole (491) and a scale (492). The indicator (417) is triangular and is defined on one of the opposite sides of the positioning fastener (41) facing the driving fastener (43). The side of the measure wheel (49) faces the driving fastener (43). The wheel hole (491) is defined axially through the measure wheel (49) and is mounted securely around the O-ring (48). The scale (492) is defined on the side of the measure wheel (49) and corresponds to the indicator (417). With the measure wheel (49) connected securely around the adjustment shaft (45) through the O-ring (48), the measure wheel (49) is rotated with the adjustment shaft (45). Moreover, with the indicator (417) and the scale (492), this can facilitate users to adjust and know the adjusted distance between the positioning fastener (41) and the driving fastener (43).

Figure 9:
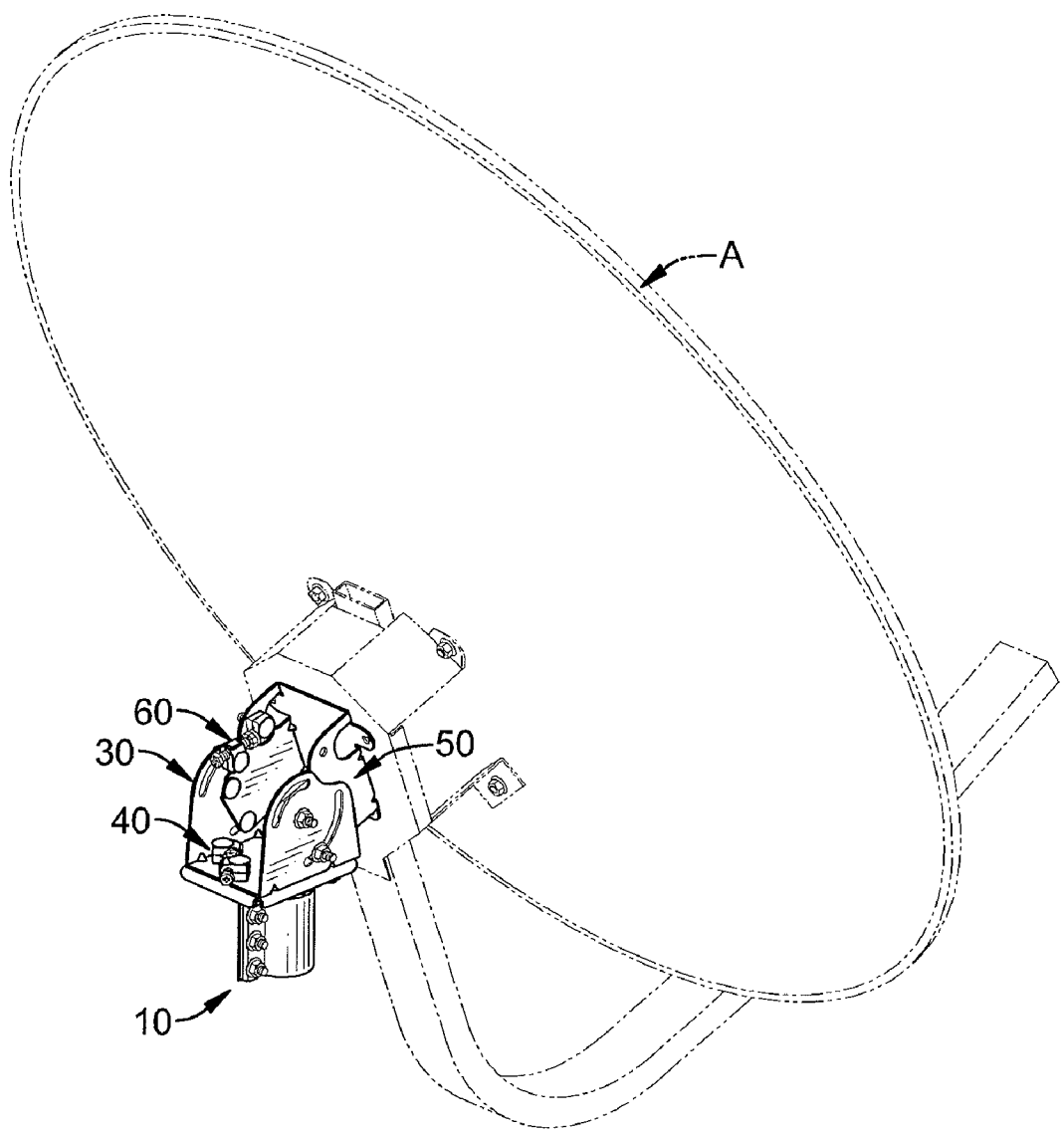
FIG. 9 is a perspective view of the adjustment assembly in FIG. 1 combined with a satellite antenna.

The inclination bracket (50) is pivotally connected to the rotation bracket (30) and has an inclination base (51), a pair of inclination wings (52,53), a pair of inclination positioning holes (54,55), a pair of inclination pivotal holes (56,57), a pair of inclination holes (58,59), a pair of inclination pivotal bolts (5A,5B), a pair of inclination bolts (5C,5D) and multiple inclination nuts (5E,5F,5G,5H). The inclination base (51) may be connected to a satellite antenna (A) as shown in FIG. 9 and has a pair of opposite edges. The inclination wings (52,53) respectively protrude from the opposite edges of the inclination base (51) and are respectively adjacent to the wings of the rotation bracket (30). The inclination positioning holes (54,55) are respectively defined through the inclination wings (52,53). The inclination pivotal holes (56,57) are respectively defined through the inclination wings (52,53) and respectively align with the wing pivotal holes (3I,3J). The inclination holes (58,59) are respectively defined through the inclination wings (52,53) and respectively align with the guiding grooves (3K,3L). The inclination pivotal bolts (5A, 5B) are respectively mounted in sequence through the inclination pivotal holes (56,57) and through the wing pivotal holes (3I,3J). The inclination bolt (5C,5D) are respectively mounted in sequence through the inclination holes (58,59) and through the guiding grooves (3K,3L). The inclination nuts (5E,5F,5G,5H) are respectively screwed with the inclination pivotal bolts (5A,5B) and the inclination bolts (5C, 5D).

The second adjustment device (60) is mounted between the rotation bracket (30) and the inclination bracket (50) and has a positioning fastener (61), a positioning bolt (62), a driving fastener (63), a driving bolt (64), an adjustment shaft (65), a positioning nut (66), a driving nut (67), an O-ring (68) and a measure wheel (69). The second adjustment device (60) has a structure the same as that of the first adjustment device (40) so detailed description of the second adjustment device (60) is omitted. The positioning fastener (61) of the second adjustment device (60) is mounted on the inclination bracket (50) and has a through hole. The through hole of the positioning fastener (61) of the second adjustment device (60) aligns with a corresponding inclination positioning hole (55). The positioning bolt (62) of the second adjustment device (60) is mounted in sequence through the through hole of the positioning fastener (61) of the second adjustment device (60) and the inclination positioning hole (55). The driving fastener (63) of the second adjustment device (60) is mounted on the rotation bracket (30) and has a through hole. The through hole of the driving fastener (63) of the second adjustment device (60) aligns with a corresponding stabilizing groove (3H) of the rotation bracket (30). The driving bolt (64) is mounted in sequence through the through hole of the driving fastener (63) of the second adjustment device (60) and a corresponding stabilizing groove (3H) of the rotation bracket (30). The positioning nut (66) is screwed with the positioning bolt (62) of the second adjustment device (60). The driving nut (67) is screwed with the driving bolt (64) of the second adjustment device (60).

Figure 7:
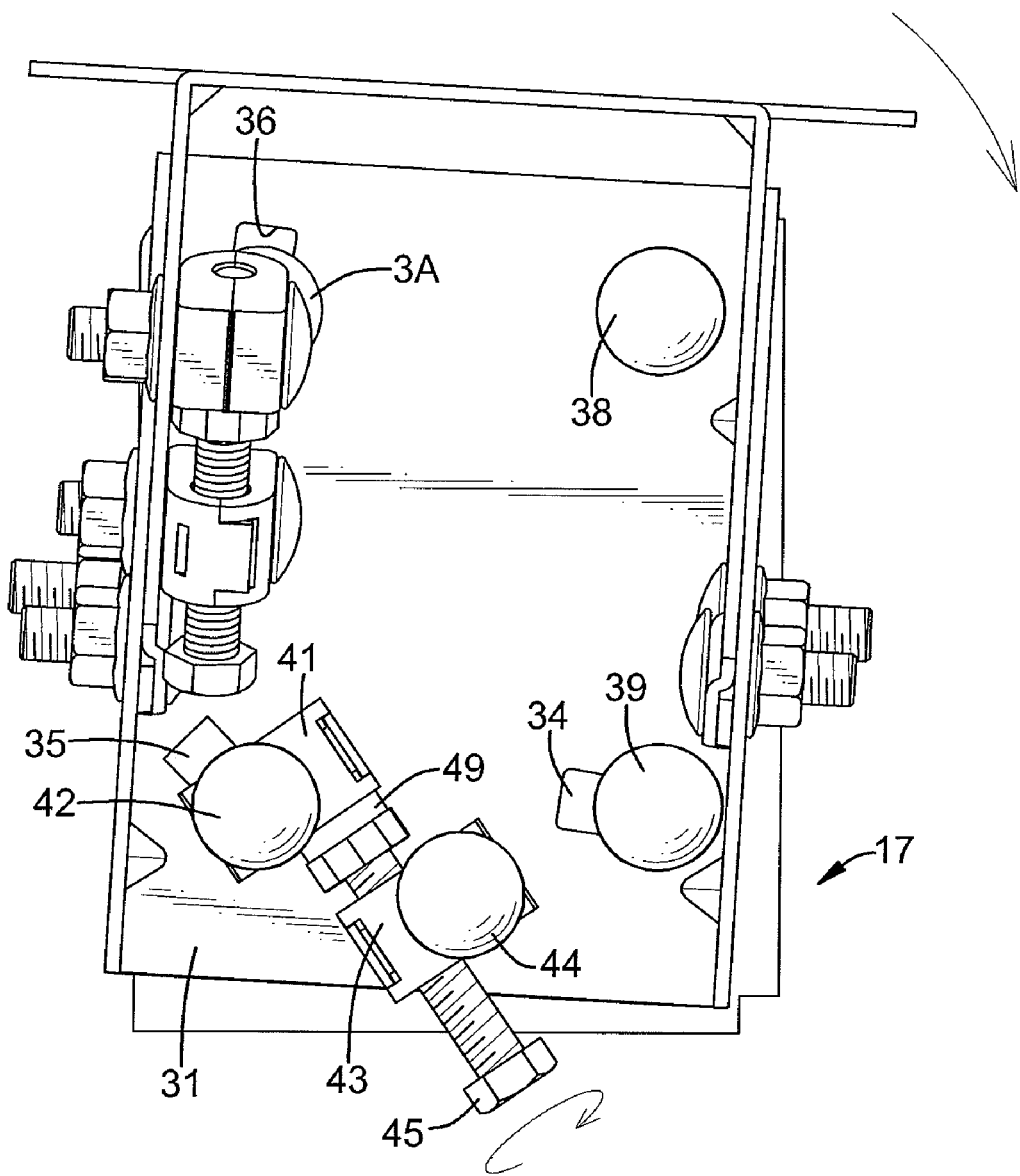
FIG. 7 is an operational top view of the adjustment assembly for a satellite antenna in FIG. 1, wherein a latitudinal angle of a satellite antenna is adjusted.

With further reference to FIG. 7, the first adjustment device (40) is operated to adjust a latitudinal angle of the conventional satellite antenna (A). First, the nuts (3B,3C,3D), the positioning nut (46) of the first adjustment device (40) and the driving nut (47) of the first adjustment device (40) are loosened. Second, the adjustment shaft (45) of the first adjustment device (40) is rotated to make the rotation bracket (30) pivot relative to the stationary bracket (10). Because the pivotal bolt (38), the bolts (39,3A) and the positioning bolt (42) of the first adjustment device (40) are respectively anchored and immovable in the pivotal hole (13) of the stationary bracket (10), the stationary holes (14,16) and the positioning hole (15) of the stationary bracket (10), the driving fastener (43) of the first adjustment device (40) moves along the threaded section (451) when the adjustment shaft (45) of the first adjustment device (40) is rotated. Consequently, the adjustment shaft (45) of the first adjustment assembly (40) swings slightly and the rotation bracket (30) pivots slightly and latitudinally relative to the pivotal bolt (38). At this time, the pivotal bolt (38), the stationary bolts (39,3A), the positioning bolt (42) and the board (17) are kept from moving, and the driving fastener (43) drives the driving bolt (44) of the first adjustment device (40) and the base (31) to pivot. Moreover, the board opening (177) can restrict a movement distance of the driving bolt (44) of the first adjustment device (40), and accordingly, a pivotal distance of the rotation bracket (30) can be restricted.

Figure 8:
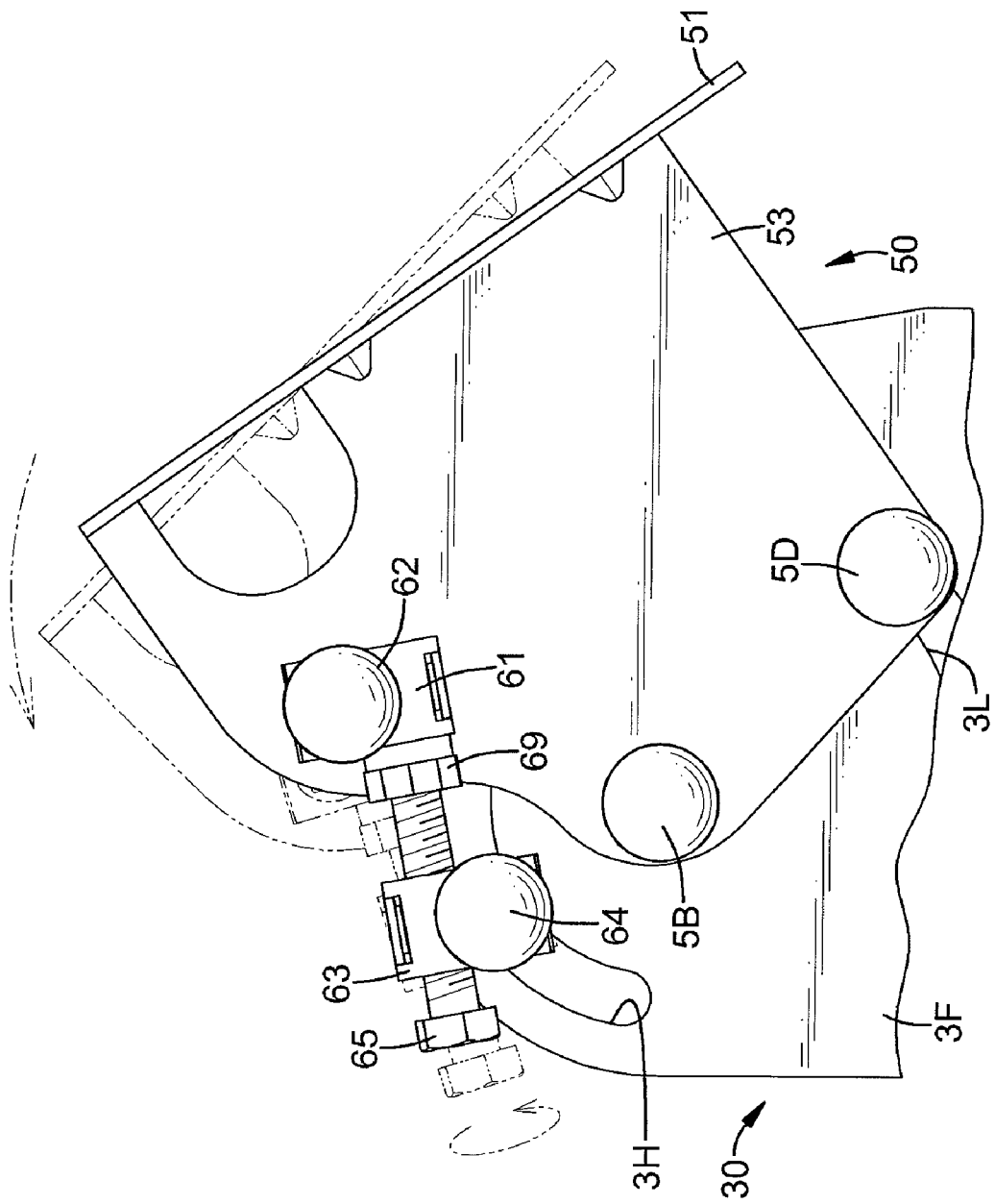
FIG. 8 is an enlarged operational side view of the adjustment assembly for a satellite antenna in FIG. 1, wherein a longitudinal angle of a satellite antenna is adjusted.

With further reference to FIG. 8, the second adjustment device (60) is operated to adjust a longitudinal angle of the satellite antenna (A). First, the inclination nuts (5E,5F,5G, 5H), the positioning nut (66) of the second adjustment device (60) and the driving nut (67) of the second adjustment device (60) are respectively loosened. Second, the adjustment shaft (65) of the second adjustment device (60) is rotated to make the inclination bracket (50) pivot relative to the rotation bracket (30). At this time, the inclination pivotal bolts (5A, 5B) are respectively anchored and immovable in the inclination pivotal holes (56,57), and the driving bolt (64) is immovable in the stabilizing groove (3H) of the rotation bracket (30). Thus, the positioning fastener (61) of the second adjustment device (60) moves relative to the driving fastener (63) of the second adjustment device (60) when the adjustment shaft (65) of the second adjustment device (60) is rotated. Consequently, the adjustment shaft (65) of the second adjustment device (60) swings slightly and the inclination bracket (50) pivots slightly and longitudinally relative to the inclination pivotal bolts (5A,5B). The inclination pivotal bolts (5A,5B) and the driving bolt (64) are kept from moving, and the adjustment shaft (65) of the second adjustment device (60) drives the positioning fastener (61) of the second adjustment device (60) and the inclination wing (53) to pivot. Moreover, the inclination bolts (5C,5D) also respectively move slightly along the guiding grooves (3K,3L) of the rotation bracket (30).

With the above description, it is noted that the invention has the following advantages:

1. Different choice for users:

The present invention provides users another different new adjustment assembly for a satellite antenna for improved product choice.

2. Precise adjustment:

Because of the indicators (417), users can precisely adjust and know the adjusted movement distance for improved convenience.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustment assembly for a satellite antenna comprising:
    a first bracket having a pivotal hole;
    a second bracket mounted pivotally on the first bracket and having
        a pivotal hole aligning with the pivotal hole of the first bracket;

a pivotal bolt mounted in the pivotal hole of the first bracket and in the pivotal hole of the second bracket and serving as a fulcrum when the brackets pivot relatively; and a first adjustment device mounted between the first bracket and the second bracket and having
- a positioning fastener mounted on the first bracket and having
  - a top;
  - a bottom;
  - a pair of opposite sides;
  - a hollow defined through the opposite sides of the positioning fastener; and
  - a through hole defined through the top and the bottom of the positioning fastener;
- a positioning bolt mounted in the through hole of the positioning fastener and combined securely with the first bracket;
- a driving fastener mounted on the second bracket and having
  - a top;
  - a bottom;
  - a pair of opposite sides;
  - a threaded hollow defined through the opposite sides of the driving fastener, aligning with the hollow of the positioning fastener and having a length; and
  - a through hole defined through the top and the bottom of the driving fastener;
- a driving bolt mounted in the through hole of the driving fastener and combined securely with the second bracket; and
- an adjustment shaft mounted through the driving fastener and into the positioning fastener and having
  - an outer surface;
  - a threaded section defined around the outer surface of the adjustment shaft, engaged the threaded hollow and having a length longer than the length of the threaded hollow; and
  - a positioning section defined around the outer surface of the adjustment shaft beside the threaded section and mounted rotatably in the hollow of the positioning fastener.

2. The adjustment assembly for a satellite antenna as claimed in claim 1, wherein
the hollow of the positioning fastener has
  an inner surface;
  an annular inner protrusion protruding from the inner surface of the hollow of the positioning fastener; and
the positioning section has
  an annular groove defined around the positioning section and combining with the inner protrusion.

3. The adjustment assembly for a satellite antenna as claimed in claim 2, wherein
the positioning fastener has
  a first chunk having a clamping face;
  a second chunk pivotally connecting to and clamping the first chunk at a pivotal axis and having a clamping face abutting with the clamping face of the first chunk;
  a pair of bosses formed respectively on the clamping faces of the chunks;
  a pair of recesses formed respectively in the clamping faces, each recess on one of the chunks combing with one of the bosses on the other chunk; and
the driving fastener is composed of a pair of chunks which are similar to the first chunk and the second chunk of the positioning fastener.

4. The adjustment assembly for a satellite antenna as claimed in claim 3, wherein
the positioning fastener has
  a clamping protrusion protruding from one end of the first chunk of the positioning fastener opposite to the pivotal axis; and
  a clamping recess recessed in the second chunk of the positioning fastener and detachably engaging the clamping protrusion; and
the driving fastener has the same clamping protrusion and the same clamping recess.

5. The adjustment assembly for a satellite antenna as claimed in claim 4, wherein
the positioning fastener of the first adjustment device has a triangular indicator defined on one of the opposite sides facing the driving fastener of the first adjustment device; and
the first adjustment device has
  an O-ring mounted securely around the positioning section and adjacent to the threaded section; and
  a measure wheel mounted securely around the O-ring and adjacent to the indicator and having
    one side facing the driving fastener of the first adjustment device;
    a wheel hole defined axially through the measure wheel and mounted securely around the O-ring; and
    a scale defined on the side of the measure wheel.

6. The adjustment assembly for a satellite antenna as claimed in claim 1, wherein
the first bracket has a positioning hole defined through the first bracket;
the second bracket has
  an arced positioning opening defined through the second bracket, aligning with the positioning hole and having an arc fulcrum at the pivotal hole of the second bracket; and
  a driving hole defined through the second bracket and aligning with the through hole of the driving fastener; and
the first adjustment device has
  a positioning nut screwed with the positioning bolt which is mounted in sequence through the through hole of the positioning fastener, the positioning opening and the positioning hole; and
  a driving nut screwed with the driving bolt which is mounted through the through hole of the driving fastener and the driving hole.

7. The adjustment assembly for a satellite antenna as claimed in claim 2, wherein
the first bracket has a positioning hole defined through the first bracket;
the second bracket has
  an arced positioning opening defined through the second bracket, aligning with the positioning hole and having an arc fulcrum at the pivotal hole of the second bracket; and
  a driving hole defined through the second bracket and aligning with the through hole of the driving fastener; and
the first adjustment device has
  a positioning nut screwed with the positioning bolt which is mounted in sequence through the through hole of the positioning fastener, the positioning opening and the positioning hole; and a driving nut screwed with the driving bolt which is mounted through the through hole of the driving fastener and the driving hole.

8. The adjustment assembly for a satellite antenna as claimed in claim 3, wherein the first bracket has a positioning hole defined through the first bracket;

the second bracket has an arced positioning opening defined through the second bracket, aligning with the positioning hole and having an arc fulcrum at the pivotal hole of the second bracket; and a driving hole defined through the second bracket and aligning with the through hole of the driving fastener; and the first adjustment device has a positioning nut screwed with the positioning bolt which is mounted in sequence through the through hole of the positioning fastener, the positioning opening and the positioning hole; and a driving nut screwed with the driving bolt which is mounted through the through hole of the driving fastener and the driving hole.

9. The adjustment assembly for a satellite antenna as claimed in claim 4, wherein the first bracket has a positioning hole defined through the first bracket;

the second bracket has an arced positioning opening defined through the second bracket, aligning with the positioning hole and having an arc fulcrum at the pivotal hole of the second bracket; and a driving hole defined through the second bracket and aligning with the through hole of the driving fastener; and the first adjustment device has a positioning nut screwed with the positioning bolt which is mounted in sequence through the through hole of the positioning fastener, the positioning opening and the positioning hole; and a driving nut screwed with the driving bolt which is mounted through the through hole of the driving fastener and the driving hole.

10. The adjustment assembly for a satellite antenna as claimed in claim 5, wherein the first bracket has a positioning hole defined through the first bracket;

the second bracket has an arced positioning opening defined through the second bracket, aligning with the positioning hole and having an arc fulcrum at the pivotal hole of the second bracket; and a driving hole defined through the second bracket and aligning with the through hole of the driving fastener; and the first adjustment device has a positioning nut screwed with the positioning bolt which is mounted in sequence through the through hole of the positioning fastener, the positioning opening and the positioning hole; and a driving nut screwed with the driving bolt which is mounted through the through hole of the driving fastener and the driving hole.

11. The adjustment assembly for a satellite antenna as claimed in claim 6, wherein the second bracket has a base through which the driving hole and the positioning opening are respectively defined having a pair of opposite edges;

a pair of wings respectively forming on and respectively protruding upward from the opposite edges of the base;

a pair of stabilizing grooves respectively defined through the wings;

a pair of wing pivotal holes respectively defined through the wings; and a pair of guiding grooves respectively defined through the wings; and the wing pivotal holes are respectively between the stabilizing grooves and the guiding grooves; and the stabilizing grooves and the guiding grooves are arced and respectively have an arc fulcrum at the wing pivotal holes; and a third bracket is pivotally connected to the second bracket and has an inclination base having a pair of opposite edges;

a pair of inclination wings respectively protruding from the opposite edges of the inclination base and respectively adjacent to the wings of the second bracket;

a pair of inclination positioning holes respectively defined through the inclination wings;

a pair of inclination pivotal holes respectively defined through the inclination wings and respectively aligning with the wing pivotal holes;

a pair of inclination holes respectively defined through the inclination wings and respectively aligning with the guiding grooves;

a pair of inclination pivotal bolts respectively mounted in sequence through the inclination pivotal holes and through the wing pivotal holes;

a pair of inclination bolts respectively mounted in sequence through the inclination holes and through the guiding grooves; and multiple inclination nuts respectively screwed with the inclination pivotal bolts and the inclination bolts.

12. The adjustment assembly for a satellite antenna as claimed in claim 7, wherein the second bracket has a base through which the driving hole and the positioning opening are respectively defined having a pair of opposite edges;

a pair of wings respectively forming on and respectively protruding upward from the opposite edges of the base;

a pair of stabilizing grooves respectively defined through the wings;

a pair of wing pivotal holes respectively defined through the wings; and a pair of guiding grooves respectively defined through the wings; and the wing pivotal holes are respectively between the stabilizing grooves and the guiding grooves; and the stabilizing grooves and the guiding grooves are arced and respectively have an arc fulcrum at the wing pivotal holes; and a third bracket is pivotally connected to the second bracket and has
an inclination base having a pair of opposite edges;
a pair of inclination wings respectively protruding from the opposite edges of the inclination base and respectively adjacent to the wings of the second bracket;
a pair of inclination positioning holes respectively defined through the inclination wings;
a pair of inclination pivotal holes respectively defined through the inclination wings and respectively aligning with the wing pivotal holes;
a pair of inclination holes respectively defined through the inclination wings and respectively aligning with the guiding grooves;
a pair of inclination pivotal bolts respectively mounted in sequence through the inclination pivotal holes and through the wing pivotal holes;
a pair of inclination bolts respectively mounted in sequence through the inclination holes and through the guiding grooves; and
multiple inclination nuts respectively screwed with the inclination pivotal bolts and the inclination bolts.

13. The adjustment assembly for a satellite antenna as claimed in claim 8, wherein
the second bracket has
a base through which the driving hole and the positioning opening are respectively defined having a pair of opposite edges;
a pair of wings respectively forming on and respectively protruding upward from the opposite edges of the base;
a pair of stabilizing grooves respectively defined through the wings;
a pair of wing pivotal holes respectively defined through the wings;
and
a pair of guiding grooves respectively defined through the wings; and the wing pivotal holes are respectively between the stabilizing grooves and the guiding grooves; and the stabilizing grooves and the guiding grooves are arced and respectively have an arc fulcrum at the wing pivotal holes; and
a third bracket is pivotally connected to the second bracket and has
an inclination base having a pair of opposite edges;
a pair of inclination wings respectively protruding from the opposite edges of the inclination base and respectively adjacent to the wings of the second bracket;
a pair of inclination positioning holes respectively defined through the inclination wings;
a pair of inclination pivotal holes respectively defined through the inclination wings and respectively aligning with the wing pivotal holes;
a pair of inclination holes respectively defined through the inclination wings and respectively aligning with the guiding grooves;
a pair of inclination pivotal bolts respectively mounted in sequence through the inclination pivotal holes and through the wing pivotal holes;
a pair of inclination bolts respectively mounted in sequence through the inclination holes and through the guiding grooves; and
multiple inclination nuts respectively screwed with the inclination pivotal bolts and the inclination bolts.

14. The adjustment assembly for a satellite antenna as claimed in claim 9, wherein
the second bracket has
a base through which the driving hole and the positioning opening are respectively defined having a pair of opposite edges;
a pair of wings respectively forming on and respectively protruding upward from the opposite edges of the base;
a pair of stabilizing grooves respectively defined through the wings;
a pair of wing pivotal holes respectively defined through the wings;
and
a pair of guiding grooves respectively defined through the wings; and the wing pivotal holes are respectively between the stabilizing grooves and the guiding grooves; and the stabilizing grooves and the guiding grooves are arced and respectively have an arc fulcrum at the wing pivotal holes; and
a third bracket is pivotally connected to the second bracket and has
an inclination base having a pair of opposite edges;
a pair of inclination wings respectively protruding from the opposite edges of the inclination base and respectively adjacent to the wings of the second bracket;
a pair of inclination positioning holes respectively defined through the inclination wings;
a pair of inclination pivotal holes respectively defined through the inclination wings and respectively aligning with the wing pivotal holes;
a pair of inclination holes respectively defined through the inclination wings and respectively aligning with the guiding grooves;
a pair of inclination pivotal bolts respectively mounted in sequence through the inclination pivotal holes and through the wing pivotal holes;
a pair of inclination bolts respectively mounted in sequence through the inclination holes and through the guiding grooves; and
multiple inclination nuts respectively screwed with the inclination pivotal bolts and the inclination bolts.

15. The adjustment assembly for a satellite antenna as claimed in claim 10, wherein
the second bracket has
a base through which the driving hole and the positioning opening are respectively defined having a pair of opposite edges;
a pair of wings respectively forming on and respectively protruding upward from the opposite edges of the base;
a pair of stabilizing grooves respectively defined through the wings;
a pair of wing pivotal holes respectively defined through the wings;
and
a pair of guiding grooves respectively defined through the wings; and the wing pivotal holes are respectively between the stabilizing grooves and the guiding grooves; and the stabilizing grooves and the guiding grooves are arced and respectively have an arc fulcrum at the wing pivotal holes; and a third bracket is pivotally connected to the second bracket and has
an inclination base having a pair of opposite edges;
a pair of inclination wings respectively protruding from the opposite edges of the inclination base and respectively adjacent to the wings of the second bracket;
a pair of inclination positioning holes respectively defined through the inclination wings;
a pair of inclination pivotal holes respectively defined through the inclination wings and respectively aligning with the wing pivotal holes;
a pair of inclination holes respectively defined through the inclination wings and respectively aligning with the guiding grooves;
a pair of inclination pivotal bolts respectively mounted in sequence through the inclination pivotal holes and through the wing pivotal holes;
a pair of inclination bolts respectively mounted in sequence through the inclination holes and through the guiding grooves; and
multiple inclination nuts respectively screwed with the inclination pivotal bolts and the inclination bolts.

16. The adjustment assembly for a satellite antenna as claimed in claim 11, wherein
a second adjustment device has a structure the same as that of the first adjustment device, is mounted between the second bracket and the third bracket and has
a positioning fastener having
a through hole aligning with a corresponding inclination positioning hole;
a positioning bolt mounted in sequence through the through hole of the positioning fastener of the second adjustment device and the inclination positioning hole;
a driving fastener having
a through hole aligning with a corresponding stabilizing groove of the second bracket;
a driving bolt mounted in sequence through the through hole of the driving fastener of the second adjustment device and a corresponding stabilizing groove of the second bracket;
a positioning nut screwed with the positioning bolt of the second adjustment device;
a driving nut screwed with the driving bolt of the second adjustment device.

17. The adjustment assembly for a satellite antenna as claimed in claim 12, wherein
a second adjustment device has a structure the same as that of the first adjustment device, is mounted between the second bracket and the third bracket and has
a positioning fastener having
a through hole aligning with a corresponding inclination positioning hole;
a positioning bolt mounted in sequence through the through hole of the positioning fastener of the second adjustment device and the inclination positioning hole;
a driving fastener having
a through hole aligning with a corresponding stabilizing groove of the second bracket;
a driving bolt mounted in sequence through the through hole of the driving fastener of the second adjustment device and a corresponding stabilizing groove of the second bracket;
a positioning nut screwed with the positioning bolt of the second adjustment device;
a driving nut screwed with the driving bolt of the second adjustment device.

18. The adjustment assembly for a satellite antenna as claimed in claim 13, wherein
a second adjustment device has a structure the same as that of the first adjustment device, is mounted between the second bracket and the third bracket and has
a positioning fastener having
a through hole aligning with a corresponding inclination positioning hole;
a positioning bolt mounted in sequence through the through hole of the positioning fastener of the second adjustment device and the inclination positioning hole;
a driving fastener having
a through hole aligning with a corresponding stabilizing groove of the second bracket;
a driving bolt mounted in sequence through the through hole of the driving fastener of the second adjustment device and a corresponding stabilizing groove of the second bracket;
a positioning nut screwed with the positioning bolt of the second adjustment device;
a driving nut screwed with the driving bolt of the second adjustment device.

19. The adjustment assembly for a satellite antenna as claimed in claim 14, wherein
a second adjustment device has a structure the same as that of the first adjustment device, is mounted between the second bracket and the third bracket and has
a positioning fastener having
a through hole aligning with a corresponding inclination positioning hole;
a positioning bolt mounted in sequence through the through hole of the positioning fastener of the second adjustment device and the inclination positioning hole;
a driving fastener having
a through hole aligning with a corresponding stabilizing groove of the second bracket;
a driving bolt mounted in sequence through the through hole of the driving fastener of the second adjustment device and a corresponding stabilizing groove of the second bracket;
a positioning nut screwed with the positioning bolt of the second adjustment device;
a driving nut screwed with the driving bolt of the second adjustment device.

20. The adjustment assembly for a satellite antenna as claimed in claim 15, wherein
a second adjustment device has a structure the same as that of the first adjustment device, is mounted between the second bracket and the third bracket and has
a positioning fastener having
a through hole aligning with a corresponding inclination positioning hole;
a positioning bolt mounted in sequence through the through hole of the positioning fastener of the second adjustment device and the inclination positioning hole;

a driving fastener having
 a through hole aligning with a corresponding stabilizing groove of the second bracket;
a driving bolt mounted in sequence through the through hole of the driving fastener of the second adjustment device and a corresponding stabilizing groove of the second bracket;

a positioning nut screwed with the positioning bolt of the second adjustment device;
a driving nut screwed with the driving bolt of the second adjustment device.

\* \* \* \* \*